Patented Feb. 8, 1927.

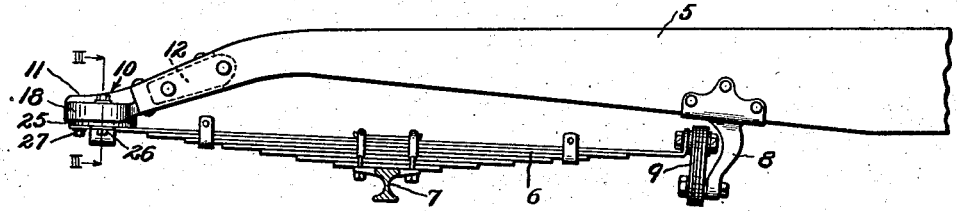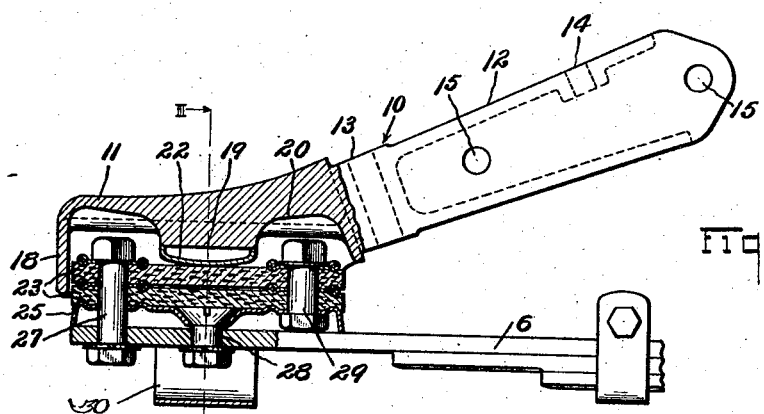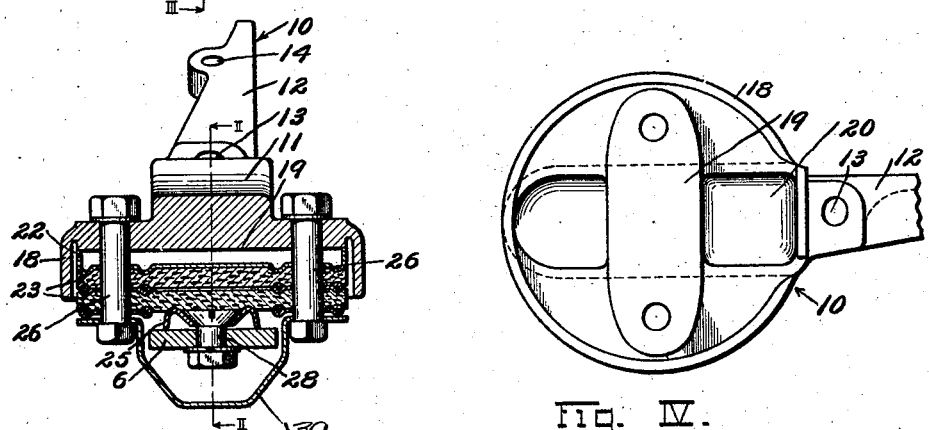

1,616,842

UNITED STATES PATENT OFFICE.

EDWARD H. BELDEN, OF TOLEDO, OHIO, ASSIGNOR TO THE WILLYS-OVERLAND COMPANY, OF TOLEDO, OHIO, A CORPORATION OF OHIO.

FLEXIBLE SPRING CONNECTION.

Application filed September 9, 1922. Serial No. 587,103.

This invention relates to spring supported vehicles and particularly to the connection between the spring and the frame of the vehicle. An object of my invention is to provide an improved bracket forming a portion of said connection.

Referring to the annexed drawing forming a part hereof,

Figure I is a side elevation of one end of a vehicle frame and a spring connected therewith illustrating my invention;

Fig. II is an enlarged view of the bracket carried by the frame and the adjacent end of the spring being in part a section taken on the line II—II of Fig. III.

Fig. III is a sectional view taken on the line III—III of Figs. I and II; and

Fig. IV is a bottom view of the outer end portion of the bracket.

The same reference numbers refer to corresponding parts throughout the views.

One end of the frame member 5 is supported by a leaf spring 6 carried by an axle 7. The inner connection between the frame and the spring is through a bracket 8 and a series of flexible strips 9. At the outer end of the frame, which, in the present instance is a channel tapering in depth toward the end is a bracket 10 having an outer head portion 11 and a shank portion 12. The latter portion is shown somewhat reduced in width and depth from the adjacent part of the head in order to fit within the flanges of the frame channel and to provide shoulders to abut the end of the frame. The shank portion of the bracket is preferably given a channel form to save weight and is provided with openings 13, 14 and 15 through which the bracket is riveted to the frame.

The outer or head end 11 of the bracket is shown of circular form having an integral depending peripheral flange 18, a transverse depending boss 19, and a recess 20 on each side of the boss. A sheet metal plate 22, engages the boss 19 on one side and on the other rests against the upper disk of a pair of rubberized fabric disks 23. The lower disk of the pair is separated from the spring 6 by a sheet metal plate 25. Two bolts 26 passing through the bracket head at opposite sides serve to secure the disks to the bracket and other bolts 27, 28 and 29 serve to secure the disks together and to the spring 6 in the manner shown. A bracket so constructed having a circular head and depending flange effectively hides from view the disks and the bolts 27 and 29 thereby presenting a neat appearance. It also excludes dirt and water from the disks and parts resting thereon permitting their proper functioning at all times and prolonging their life. The strap 30, which has its opposite ends secured to the bolts 26, forms a safety device for the spring to prevent separation of the latter from the frame, in case the bolt 27 is broken. The strap also serves to keep the lower ends of the bolts 26 properly centered by holding them against lateral movement.

While I have shown and described in detail a particular structural embodiment as illustrative of my invention, I do not wish to be limited thereby, since various changes might be made therein without departing from the scope of the invention covered by the appended claims.

Having thus described my invention what I claim as new and desire to secure by Letters Patent is:

1. In a vehicle spring connection, a flexible disc, means for securing said disc to a vehicle spring, and a bracket having a shank for connection with a vehicle frame and a plate like head portion with a depending peripheral flange for connection with and for enclosing said disc and said securing means.

2. In a vehicle spring connection comprising a fabric disk, a bracket for connecting said disk and the frame of said vehicle, said bracket having a circular plate portion overlying said disk and an annular peripheral flange surrounding said disk.

3. In combination, a spring, a pair of fabric disks, means for securing said disks together and to said spring, a bracket having a shank portion and a circular head portion, a vehicle frame secured to said shank and means passing through said head portion to secure the same to said disks, said head having a depending peripheral flange extending about said disks.

4. In a vehicle spring connection, a frame, a bracket upon the frame having a recess formed in the underside thereof, a spring adjacent the bracket, a flexible disc disposed within said recess, means connecting the flexible disc with the bracket, and separate means connecting said disc with the spring.

In testimony whereof, I affix my signature.

EDWARD H. BELDEN.